Nov. 23, 1965  A. J. KINDIG  3,219,176
BELT CONVEYOR IDLER
Filed Aug. 29, 1963
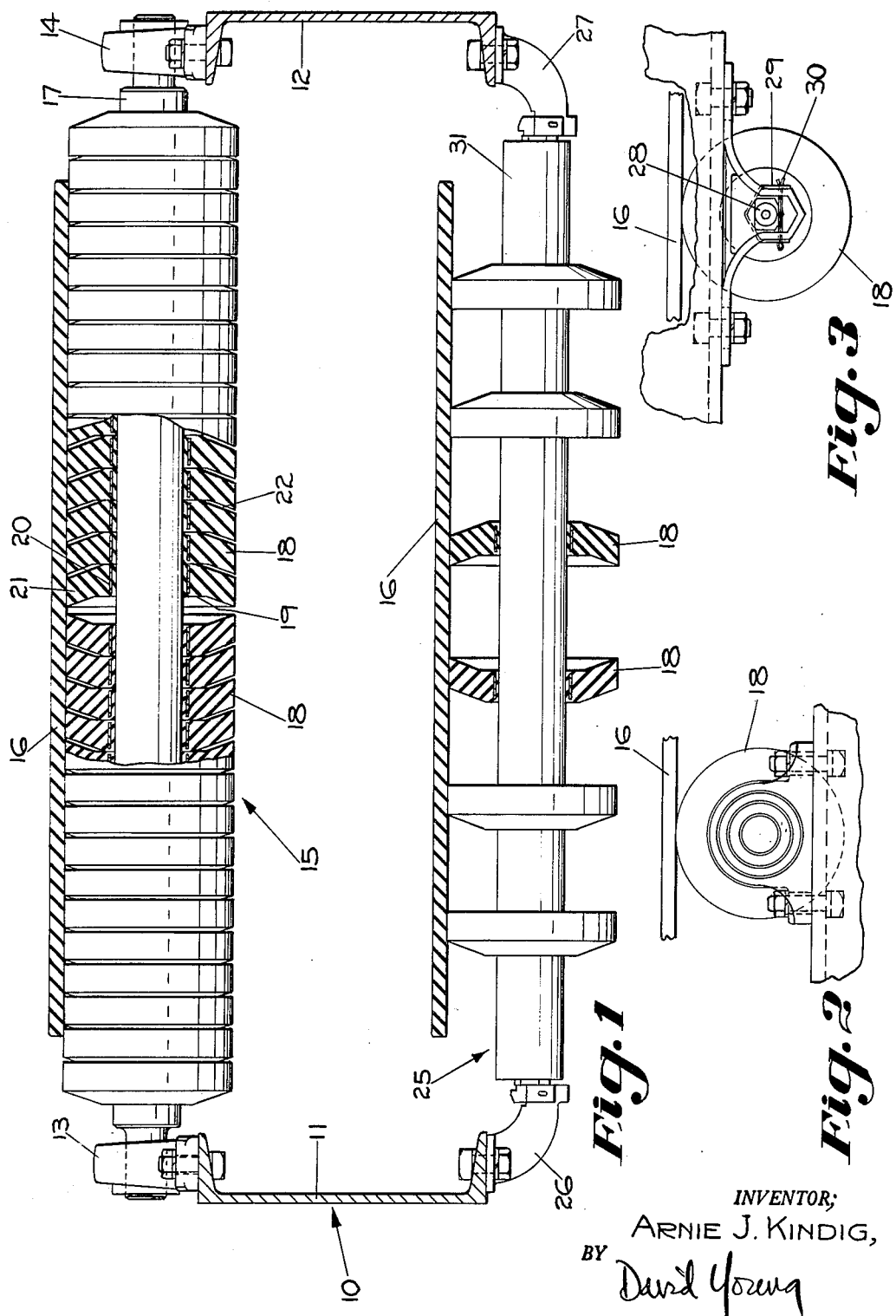
INVENTOR:
ARNIE J. KINDIG,
BY David Young
ATT'Y.

United States Patent Office 3,219,176
Patented Nov. 23, 1965

3,219,176
BELT CONVEYOR IDLER
Arnie J. Kindig, Marysville, Ohio, assignor to Jeffrey Galion Manufacturing Company, a corporation of Ohio
Filed Aug. 29, 1963, Ser. No. 305,346
2 Claims. (Cl. 198—192)

The instant invention relates to belt conveyors, and more particularly, to an improved idler construction for belt conveyors, the idler of this invention having a training action on the belt operating to maintain the belt in centered position.

It is the prime object of this invention to provide an improved belt conveyor idler construction, which is operative to support the belt and maintain it in a centered position, such idler comprising a plurality of discs assembled on a shaft.

It is a further object of the instant invention to provide an improved training idler construction for a belt conveyor, in which the idler comprises a plurality of flexible discs which are radially inclined so as to have a conical configuration.

It is another object of the instant invention to provide a discs element for the construction of training idlers for belt conveyors, the disc element being such that a plurality of discs may be assembled in abutting relation to each other, or they may be spaced from each other, depending upon the load carrying capacity required of the idlers.

Other objects of the invention will appear hereinafter, the novel features and combinations being set forth in the appended claims.

In the accompanying drawings:

FIG. 1 is a transverse view, partially in section, of a belt conveyor incorporating two belts idlers constructed in accordance with the instant invention;

FIG. 2 is a side elevation view of the upper idler of FIG. 1; and

FIG. 3 is a side elevational view of the lower idler of FIG. 1.

Referring to the drawings, there is illustrated therein a belt conveyor 10 having a suitable frame which includes side frame members 11, 12 disposed one at each side thereof. A bearing 13 is secured to the top of the said frame member 11, and a like bearing 14 is secured to the top of the side frame member 12. The idler 15 is rotatably supported by the bearings 13, 14, and extends between these bearings.

The idler 15 supports the conveyor belt 16 in its conveying run. A plurality of idlers 15 are disposed at spaced positions along the length of the conveyor 10. The number of such idlers 15 is determined by the load carrying capacity of the conveyor 10. The conveyor belt 16 rides on the several belt idlers 15, in contact with the peripheries thereof.

The conveyor belt idler 15 includes a shaft 17, the ends of which are rotatably mounted in the opposite bearings 13, 14. The idler 15 is made up of a plurality of discs 18, each of which has the same configuration. The disc 18 is formed of yieldable material, so that it is capable of flexure when a force is applied thereto, as will be described in greater detail hereinafter. The disc 18 is formed with a hub 19 that is disposed substantially transversely of the shaft axis. Within the hub 19 there is imbedded a band 20 of non-yieldable material, which is preferably metal, such as steel. The portion of the disc 18 which extends radially beyond the hub 19 is inclined with respect to the axis of the shaft 17 and has a conical configuration. The hub portion of the disc 18 is thicker in an axial direction than is the inclined portion 21 of the disc 18.

The several discs 18 are assembled on the shaft 17 by sliding the discs 18 along the shaft 17, with the aid of a suitable lubricant, to the desired positions of the discs 18 on the shaft 17. The discs 18 are then held in place on the shaft 17 by reason of the press fit between the bores of the discs 18 and the surface of the shaft 17. The non-yieldable band 20 in each disc 18 has the effect of segregating the material of the hub 19 within the band 20, from the remaining portion of the disc 18 which is disposed radially outwardly of the band 20. The material of the hub 19, within the band 20, is compressed in press fitting the disc on the shaft 17. However, such compression does not affect the yieldable characteristics of the remaining portion of the disc 18, particularly the body portion 21 thereof.

As seen in FIG. 1, in the idler 15 the several discs 18 at one side of the transverse center line of the idler 15 are assembled in one direction, and the discs 18 at the other side of said center line are assembled in the opposite direction, whereby the discs 18 are secured on the shaft 17 in two opposite groups. In each group the discs 18 are assembled with the hubs 19 thereof abutting, and the body portions 21 of the respective groups being inclined towards each other. Since the hubs 19 are thicker in an axial direction than are the body portions 21, there is a free space 22 between the body portions 21 of adjacent discs 18. Such spacing 22 between the adjacent discs 18 permits the body portions 21 of the adjacent discs 18 to flex upon the application of force thereto.

In order to properly support the conveyor belt 16 in its conveying run, the idler 15 must have a load capacity that is commensurate with the load that is to be carried by the conveyor belt 16. Thus, the discs 18, although formed of yieldable material and being flexible, must nevertheless be sufficiently hard that they will support the conveyor belt 16 and its load. However, by reason of the construction of the discs 18, as described herein, each of the discs 18, when subjected to the load of the conveyor belt 16 and the material carried thereby, will flex inwardly to a limited degree. By reason of such flexure of the body portions 21 of the discs 18, the lines of contact between the conveyor belt 16 and the peripheries of the discs 18 will all be directed inwardly towards the transverse center line of the belt idler 15 as the conveyor belt 16 approaches each belt idler 15. This gives rise to forces acting along such lines of contact, tending to maintain the conveyor belt 16 centered on the idler, and thereby continuously training the conveyor belt 16 as it rides on the idlers 15.

The idler discs 18 may also be used to construct a return idler 25 for the return run of the conveyor belt 16, as seen in FIG. 1. The return idler 25 is supported by hangers 26, 27, which are secured to the bottoms of the side frame members 11, 12, respectively. The return idler 25 is formed with an inner shaft 28, which is fixedly secured to the hangers 26, 27 and extends between the hangers 26, 27. A suitable clip 29 secures each end of the inner shaft 28 in the respective hangers 26, 27. A cotter pin 30 is used to secure the clip 29 in place on the hangers 26, 27. An outer shaft 31 is rotatably mounted on the inner shaft 28 to be freely rotatable. A plurality of discs 18 are each secured to outer shaft 31 by a press fit, in the same manner as previously described with respect to the idler 15. The discs 18 are placed in two groups at opposite sides of the transverse center line of the return idler 25, with the discs 18 of each group being oppositely disposed.

The return idler 25 is merely required to support the conveyor belt 16 in its return run, and there is no load carried thereby. Therefore, fewer discs 18 are required for the conveyor belt 16 in its return run. In the illustrated construction of the return idler 25, six discs 18 are secured to the outer shaft 31. The load on the several discs 18, which is due to the weight of the conveyor belt 16, will cause the discs 18 to flex inwardly toward the transverse center line of the return idler 25. Thus the lines of contact between the discs 18 and the conveyor belt 16, as the latter approaches the return idler 25, will be directed inwardly towards the transverse center line of the return idler 25. This gives rise to forces acting on the conveyor belt 16 along said approaching lines of contact, operating to train the conveyor belt 16 towards the center of the return idler 25 and maintaining the conveyor belt 16 in such centered position.

The discs 18 may be utilized in various numbers and arrangements to form idlers for belt conveyors, which will train the conveyor belts to maintain them in a centered position on such idlers. Although the invention has been illustrated and disclosed herein as embodied in straight idlers, it will be understood by those skilled in the art that troughing idlers may be constructed to equal advantage utilizing the teachings of the invention contained herein. It is also a characteristic of the idlers constructed of the discs 18, that they have a training action on the conveyor belt in either direction of movement of the conveyor belt with respect to the idlers. In effect then, such idler is reversible.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a roll structure comprising a plurality of circular discs that are assembled in adjacent abutting disposition along the axis of the roll structure and on opposite sides of the transverse centerline of the roll structure to form the roll with a circumferential surface, each disc being an integral element with a hub portion and a yieldable body portion, said hub portion and said body portion together defining an inner radial disc face facing toward said transverse centerline and an outer radial disc face facing away from said transverse centerline, said hub portion being normal with respect to said axis of said roll structure, said body portion being inclined with respect to said axis of said roll structure and toward said transverse centerline, the inner radial disc face of said hub portion being of greater radial dimension than the outer radial disc face of said hub portion, the inner radial disc face of said body portion being of lesser radial dimension than the outer radial disc face of said body portion, said hub portion being of greater dimension in an axial direction than said body portion, said circular discs being disposed with the inner radial disc face of the hub portion of one disc abutting the outer radial disc face of the hub portion of an adjacent disc, and the inner radial disc face of the body portion of one disc being spaced from the outer radial disc face of the body portion of an adjacent disc.

2. In a roll structure comprising a plurality of circular discs as recited in claim 1 in which the inner radial disc face of said hub portion is parallel to the outer radial disc face of said hub portion, and the inner radial disc face of said body portion is parallel to the outer radial disc face of said body portion.

References Cited by the Examiner

UNITED STATES PATENTS

| 2,127,643 | 8/1938 | Glossmann | 198—192 |
| 2,169,624 | 8/1939 | Weiss | 198—192 |
| 3,029,655 | 4/1962 | Morrow | 198—202 |

FOREIGN PATENTS

| 1,197,503 | 12/1959 | France. |
| 870,782 | 7/1949 | Germany. |

OTHER REFERENCES

German Printed Application, 1,137,677, Oct. 4, 1962.

SAMUEL L. COLEMAN, *Primary Examiner.*

ERNEST A. FALLER, *Examiner.*